W. C. WINFIELD.
SAND MOLDING MACHINE.
APPLICATION FILED MAY 5, 1909.
994,626.
Patented June 6, 1911.
6 SHEETS—SHEET 1.
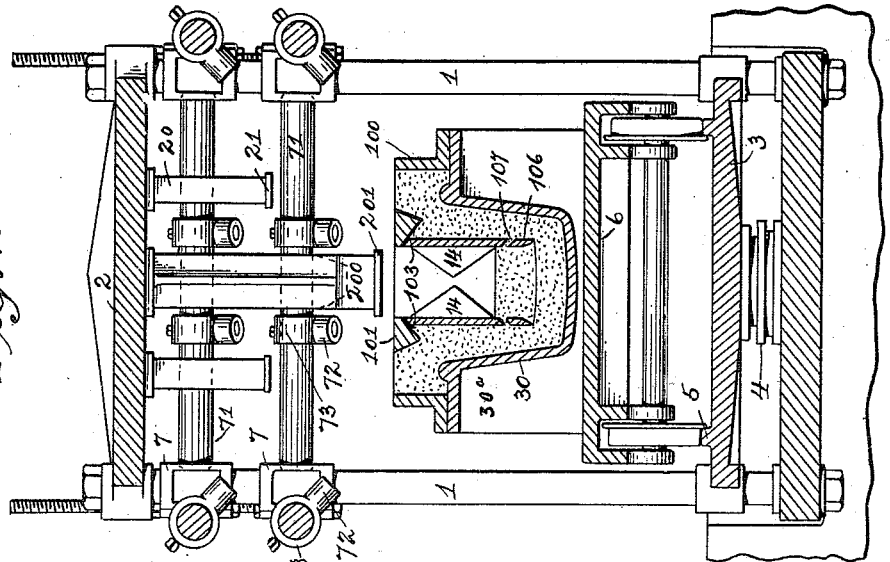
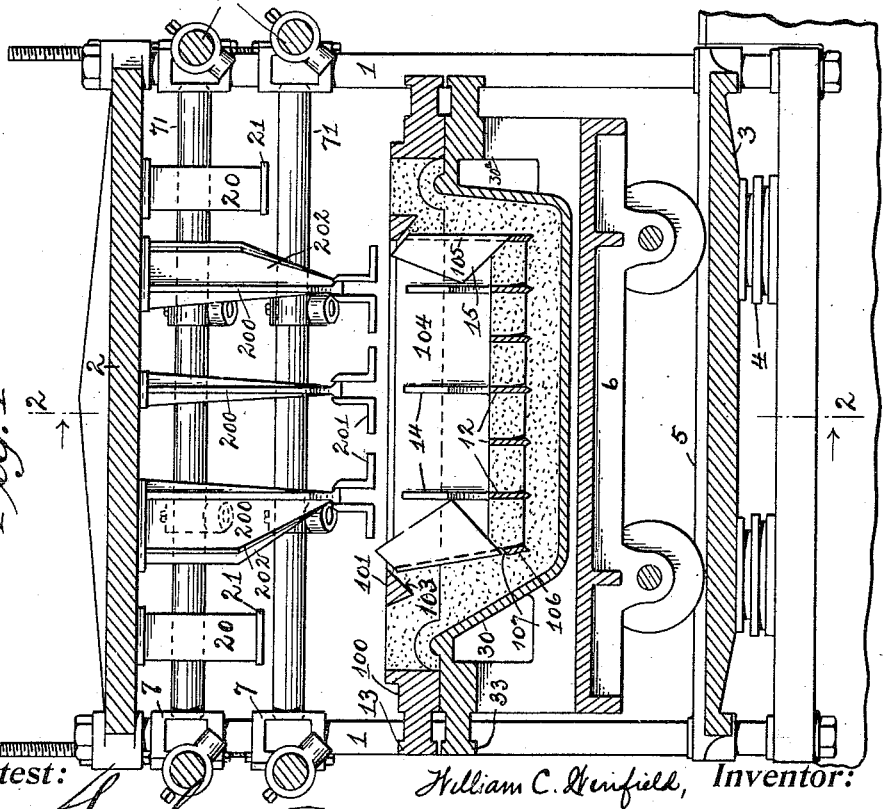
Attest:
William C. Winfield, Inventor:
by William R. Baird,
his Atty.

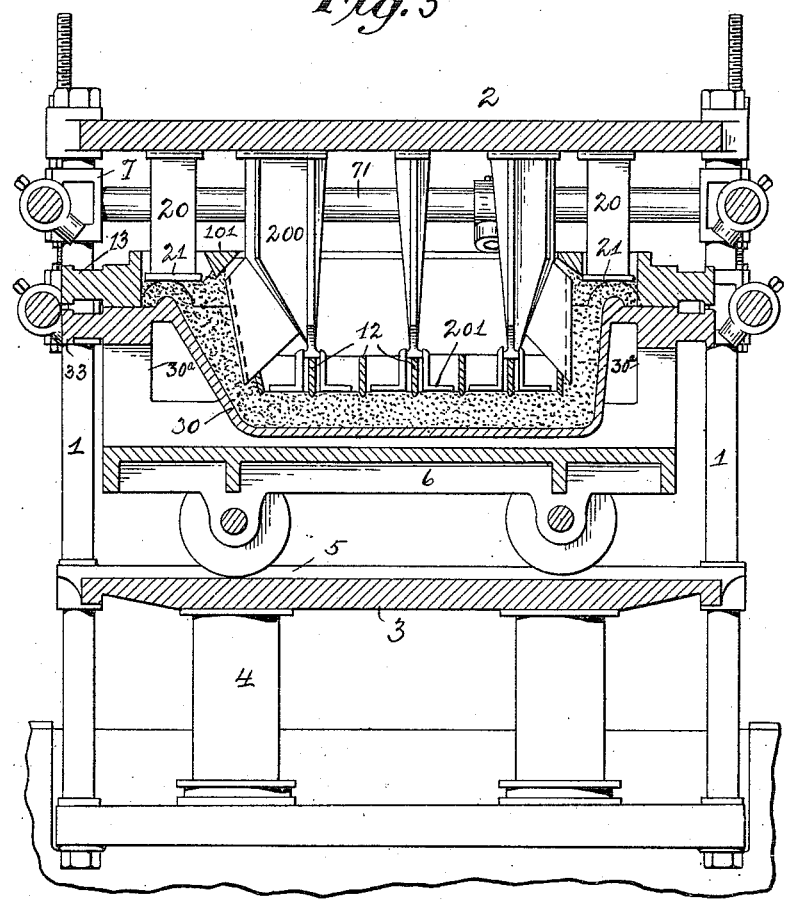

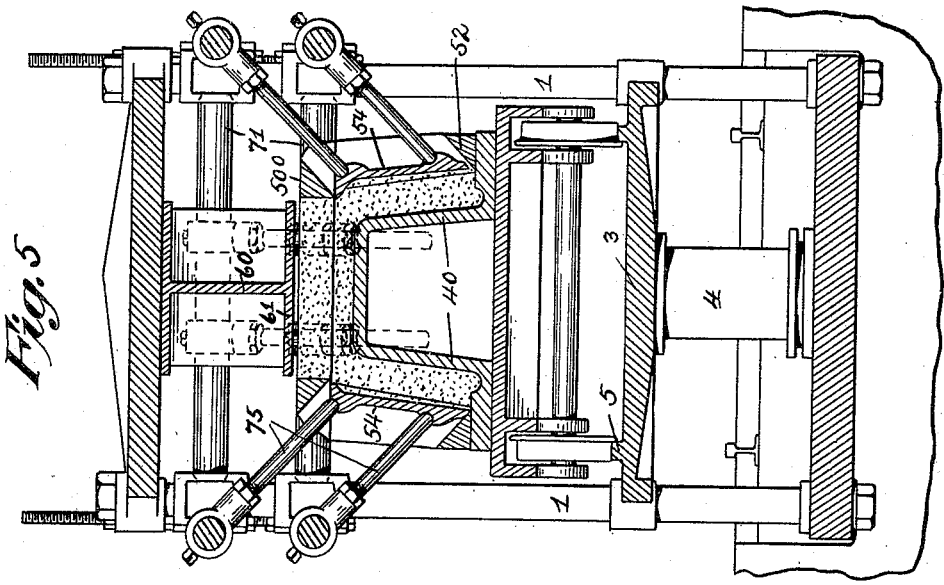

W. C. WINFIELD.
SAND MOLDING MACHINE.
APPLICATION FILED MAY 5, 1909.

994,626.

Patented June 6, 1911.
6 SHEETS—SHEET 4.

Attest:
May Hughes
Alex C. McDonnell

William C. Winfield, Inventor:
by William R. Baird
his Atty.

W. C. WINFIELD.
SAND MOLDING MACHINE.
APPLICATION FILED MAY 5, 1909.

994,626.

Patented June 6, 1911.
6 SHEETS—SHEET 5.

Attest:
May Hughes
Alden C. McDonnell.

William C. Winfield, Inventor:
by William R. Baird
his Atty.

W. C. WINFIELD.
SAND MOLDING MACHINE.
APPLICATION FILED MAY 5, 1909.

994,626.

Patented June 6, 1911.

6 SHEETS—SHEET 6.

Attest:
May Hughes
Alan C. McDonnell

William C. Winfield, Inventor:
by William R. Baird,
his Atty.

THE NORRIS PETERS CO., WASHINGTON, D. C.

UNITED STATES PATENT OFFICE.

WILLIAM C. WINFIELD, OF WARREN, OHIO, ASSIGNOR TO THE DAY WARD COMPANY, OF WARREN, OHIO, A CORPORATION OF OHIO.

SAND-MOLDING MACHINE.

994,626.  Specification of Letters Patent.  Patented June 6, 1911.

Application filed May 5, 1909. Serial No. 494,054.

*To all whom it may concern:*

Be it known that I, WILLIAM C. WINFIELD, a citizen of the United States, and resident of Warren, Trumbull county, Ohio, have invented certain new and useful Improvements in Sand-Molding Machines, of which the following is a specification.

This invention relates to machines for forming sand into molds for casting purposes and its novelty consists in the construction and adaptation of the parts, as will be more fully hereinafter pointed out.

The immediate purpose of the device is to afford a simple and efficient means for molding sand for casting comparatively large articles such as bath tubs.

Figure 6:
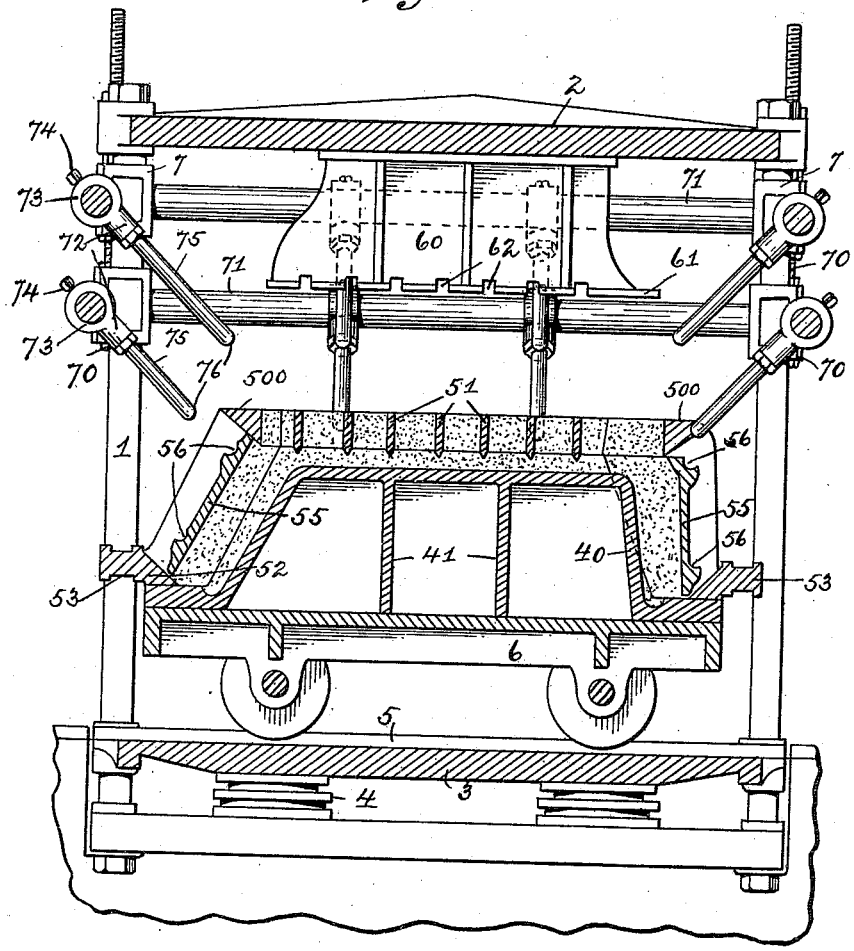
Figure 7:
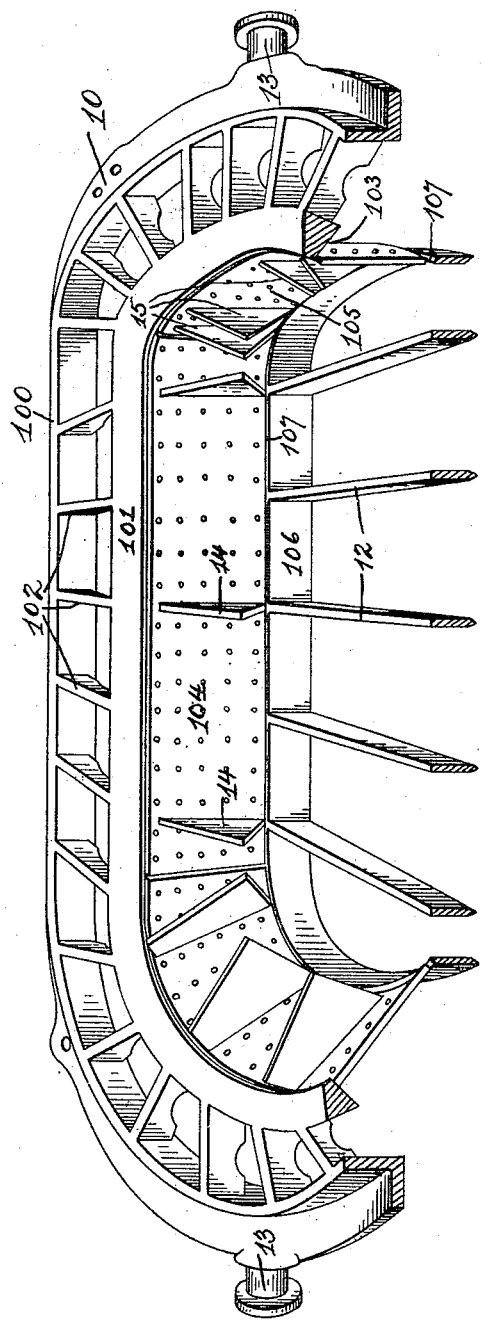
Figure 8:
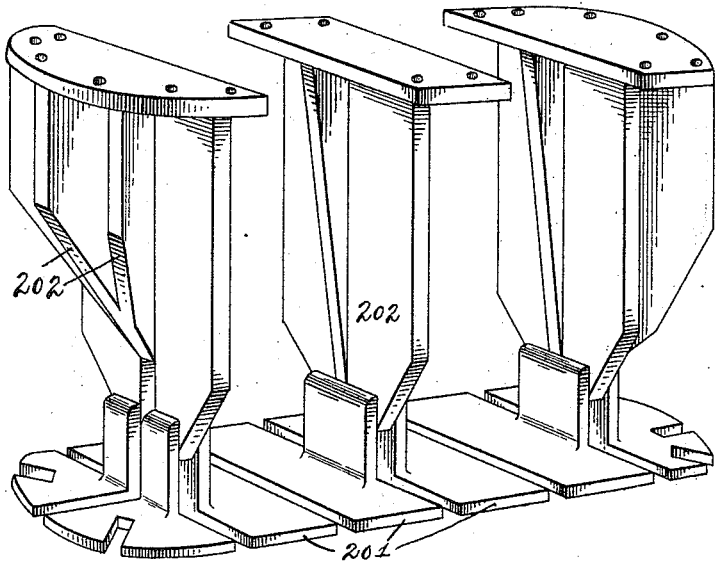
Figure 9:
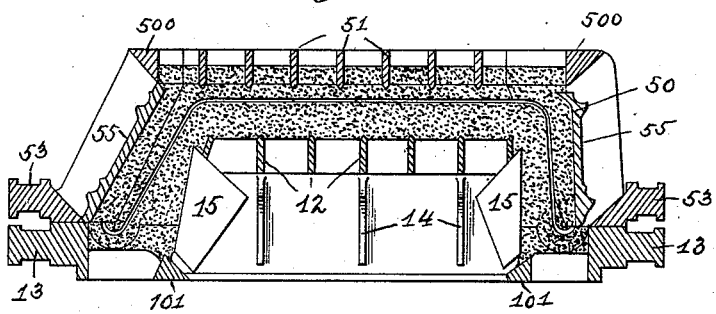

In the drawings, Figure 1 is a partial side elevation and central longitudinal vertical section of an apparatus embodying the invention showing the outer pattern in position for molding the drag, the press table and truck being lowered and the sand uncompressed. Fig. 2 is a similar view of the same parts on the plane of the line 2—2 in Fig. 1. Fig. 3 is a view of the same parts showing the truck raised and the sand compressed. Fig. 4 is a view similar to Fig. 1 showing the inner pattern in position for molding the cope, the press table and truck being raised. Fig. 5 is a similar view of the same parts on the plane of the line 5—5 in Fig. 4. Fig. 6 is a view similar to Fig. 4 showing the sand compressed and the truck lowered. Fig. 7 is a perspective of part of the drag. Fig. 8 is an enlarged perspective of the core pressers shown in Figs. 1, 2 and 3 and Fig. 9 is a central vertical section of the assembled molds and flasks ready for pouring.

In the drawings, the machine comprises uprights 1, a head 2 and a table or platform 3, the latter being adapted to be vertically moved in the uprights by means of a hydraulic press indicated at 4, 4. The platform is supplied with suitable rails or tracks 5 adapted to receive a truck or car 6 on which the pattern is placed. The drag is adapted to coöperate with the outer pattern of the article to be molded, in this case a bath tub. It comprises two oblong frames 100 and 101 united by short cross ribs 102. The lower edge 103 of the inner frame is beveled to serve as a guide as hereafter described. Within these frames are slidably mounted side sections 104 and end sections 105 suitably perforated to insure the adherence of the sand and to promote ventilation in casting and forming when taken together a frusto-conical body. Below these sections is another frame 106 continuously arranged within the pattern and provided with transverse ribs 12, 12. The upper edge 107 of the frame 106 is beveled also to serve as a guide. The side sections 104 are provided with inwardly extending wedge-shaped flanges 14 and the end sections 105 are provided with similar flanges 15. These flanges are disposed between the lower edge 103 of the frame 101 and the upper edge 107 of the frame 106. Trunnions 13 are secured to or made integral with the frame 100 to promote ease in handling. A pattern 30 is suitably supported on the truck or car 6 by any desired means, as for instance standards 30$^a$. It is supplied with trunnions 33.

Secured to the head 2 by any suitable means and depending therefrom are pressers 20 terminating at their lower ends in flat horizontal plates 21 adapted to compress the sand in the upper part of the flask. These pass between the ribs 102. Between these pressers are other pressers 200 adapted to compress the sand in the lower part of the flask to form the core. They depend from the head 2 and are provided at their lower ends with horizontal plates 201 which are bent at an angle and secured to the pressers 200 by their upturned flanges which are separated to permit the ribs 12 to pass between them. They are also provided with outwardly extending wedges 202, 202, to engage the sections 104 and 105 of the cope and move these sections outwardly toward the inner walls of the pattern whereby the sand is compressed between them and the pattern and the drag is thus formed.

The manner of operating the machine with the parts described is as follows: The parts are assembled as shown in Figs. 1 and 2 and the space inside of the pattern and between the ribs 12, 12, of the drag and the sections 104 and 105 and the pattern are filled with sand of the proper quantity and suitably moistened. The press is then operated to move the platform 3 and truck 6 upward. This brings the plates 21 of the pressers 20 into contact with the sand at the upper part of the flask and compresses it. Simultaneously the presser plates 201 compress the sand between the ribs 12 and against the pattern and the wedges 202 engage the flanges 14 and 15 of the sections 104 and 105 and move them in a direction oblique to the plane of the sections and toward the pattern and compress the sand in that quarter so that when the compressive movement is completed it will be found that the sand has been properly molded. The movement of the press is then reversed and the platform 3 and truck 6 lowered. The latter is then rolled away and the drag lifted out and the pattern and a new drag placed thereon and charged with sand and the operation is repeated.

In Figs. 4, 5 and 6, the cope and its formation are illustrated. In these views 40 is the inner pattern of the article to be molded. It is supported upon the truck 6 and on account of its large size is provided with interior reinforcing ribs 41. 50 is the cope. It comprises an oblong frame 500 between which are transverse ribs 51. Below this frame is a larger oblong frame 52 provided with trunnions 53. Between these two frames are arranged side sections 54 and end sections 55, each suitable beveled at their upper and lower edges and adapted to move between the inner surfaces of the frames 500 and 52 which serve as guides therefor. Each section is provided externally with a number of recesses 56 forming sockets adapted to engage the compression fingers presently to be described.

Secured to the head 2 by any suitable means is a presser 60 terminating at its lower end in a flat horizontal plate 61 provided with recesses 62 whereby it can straddle the cross ribs 51.

The compressing elements for the side sections 54 and end sections 55 of the cope are peculiar and require a detailed explanation. Secured to the uprights 1, 1, are boxes 7 which closely embrace the uprights and may be adjusted at any desired place and maintained in place after adjustment by any suitable device, as lock nuts, indicated at 70. Supported in bearings carried by the boxes 7 are shafts 71 arranged in pairs on all four sides of the apparatus adapted to oscillate in the bearings. Hubs or carriers 72 are each provided with straps 73 and are each adapted to encircle a shaft 71 and are secured in place after adjustment by a set screw 74. The hubs are provided with recesses and preferably internally threaded at their inner ends and are adapted to receive the threaded extremities of fingers or struts 75, the other ends 76 of which are adapted to engage the sockets 56 of the cope sections.

The manner of operating the machine with the parts just described is as follows: The pattern and cope are placed on the truck 6 and the space above the pattern and within the cope is filled with sand. The truck is then rolled onto the platform 3 which is elevated by the press 4. As the platform 3 moves upward, the fingers or struts 75 engage the sockets 56 in the cope sections 54 and 55 and cause the latter to move inwardly in a direction oblique to the plane of the sections and toward the pattern, being guided by the inner edges of the upper and lower frames of the patterns, and compress the sand, the upward movement of the platform causing the hubs or carriers 72 and the shafts on which they are mounted to oscillate slightly while this is being accomplished. In the meantime, the presser plates 61 have compressed the sand in the upper part of the cope. The press is then reversed and the platform 3 lowered as indicated in Fig. 6 and the truck 6 with its load is removed. The cope is then lifted off of the pattern by its trunnions and the pattern is used with another cope. The parts of the flask are then assembled as shown in Fig. 8.

It will be understood that suitable pouring gates are formed during the compression of the sand in both the drag and cope but they have been omitted from the drawings in order to avoid confusion.

What I claim as new is:—

1. A drag or cope comprising a framework provided with separate bodily movable sand pressing sections.

2. A drag or cope comprising a framework provided with separate laterally and bodily movable sand pressing sections, each provided with means whereby it may be moved obliquely to the longitudinal axis of the drag.

3. A drag or cope comprising a framework provided with separate bodily movable sand pressing sections, each provided with means whereby it may be moved obliquely in the framework of the drag.

4. A flask member, comprising separate sections, each movable bodily in a direction oblique to the plane of the section.

5. A flask member comprising a framework, separate sections, each movable bodily in a direction oblique to the plane of the section, and means on the framework for guiding the sections in such movement.

6. A flask member comprising a framework, laterally movable sand pressing sections located in the framework, and means for effecting the movement of the sections in the framework.

7. A drag or cope comprising a separable section provided with internal sloping surfaces adapted to be moved by contact with similar sloping surfaces.

8. A flask member comprising a separable section provided with internal flanges having oblique edges, and means that operate on said edges to move the section.

9. A drag or cope comprising a separable section provided with internal rearwardly extending flanges each provided with sloping surfaces.

10. A drag or cope comprising a framework provided with separate laterally movable sections, each provided with means whereby it may be moved obliquely to the longitudinal axis of the drag and means for guiding such movement, consisting of bevels on the coöperating edges of the framework.

11. A drag or cope comprising a framework provided with separate laterally movable sections, each provided with means whereby it may be moved obliquely to the framework of the drag and means for guiding such movement, consisting of bevels on the coöperating edges of the framework.

12. A drag comprising two concentric horizontal frames on substantially the same level and connected together, a third horizontal frame smaller than either of the other frames and arranged on a different level and sloping sides connecting the two frames with the one frame arranged in sections capable of separate movement.

13. A drag comprising two concentric horizontal frames on substantially the same level and connected by ribs, a third frame on a different level provided with internal ribs, and separable sloping surfaces arranged between the two frames and the third frame.

14. A drag comprising two concentric horizontal frames on substantially the same level and connected by ribs, a third frame on a different level provided with internal ribs and separable sloping surfaces arranged between the two frames and the third frame and adapted to be moved in a direction oblique to all three frames.

15. A drag comprising two concentric horizontal frames on substantially the same level and connected by ribs, a third frame on a different level provided with internal ribs and separable sloping surfaces arranged between the two frames and the third frame and adapted to be moved in a direction oblique to all three frames and guided in such movement by the third frame and one of the other frames.

16. A pattern in combination with a drag or cope provided with separate elements individually movable with respect to the pattern to compress sand arranged between the drag and the pattern.

17. A frusto-conical pattern in combination with a frusto conical drag, the latter having its sloping surfaces separately movable with respect to the pattern.

18. A frusto-conical pattern in combination with a frusto-conical drag, the latter having its sloping surfaces separately movable with respect to the pattern and means for moving such surfaces in a direction substantially at a right angle to the sloping surfaces of the pattern.

19. In a machine of the kind described, a compressor comprising horizontal and oblique pressing surfaces.

20. The combination with a cope or drag having separately movable sloping surfaces of a compressor having surfaces adapted to engage therewith to move the separate surfaces of the drag in a direction different from the direction of movement of the compressor.

21. The combination with a cope or drag having separately movable sloping surfaces of a compressor having surfaces adapted to engage therewith to move the separate surfaces of the drag in a direction oblique to that of the relative movement of the drag and the compressor.

22. A compressor comprising pressers having terminal horizontal plates and oblique sides.

23. The combination with a drag having a lower horizontal frame, an upper horizontal frame and intermediate sloping sides consisting of separately movable sections, of a compressor having horizontal elements adapted to coöperate with the horizontal frames and sloping elements adapted to coöperate with the movable sections.

24. The combination with a drag having a lower horizontal frame provided with transverse ribs and sloping sides, consisting of movable sections, of a compressor having horizontal elements adapted to pass between the ribs and oblique elements adapted to engage the movable sections.

25. A cope or drag having sloping sides separately movable in sections, each section having sockets adapted to coöperate with suitable compressing elements.

26. The combination with a pattern, of a cope or drag having separately movable sections and means for moving such sections with respect to the pattern comprising struts or fingers adapted to contact therewith.

27. A compressing device for a molding machine, comprising a plurality of struts, oscillating supports therefor and means for varying their effective length.

28. A compressing device for a molding machine, comprising a plurality of struts, oscillating supports therefor and means for varying their effective length, consisting of carriers secured to the supports and provided with means for adjusting the struts longitudinally therein.

29. A molding machine comprising a frame, shafts carried thereon and adapted to oscillate and struts secured to and moving with the shafts to which they are attached.

30. A molding machine comprising a frame, shafts carried thereon and adapted to oscillate and struts secured to and moving with the shafts to which they are attached, a pattern, a cope or drag having movable sides adapted to be engaged by the struts and means for creating a relative movement between the shafts and the pattern.

31. A flask member, comprising a framework, and laterally movable sand pressing sections located in the framework, and having a slidable engagement therewith.

32. A flask member, comprising a pattern surrounding framework, and side walls or sections slidably mounted in the framework, and movable toward a pattern placed therein.

33. In molding apparatus, a pattern surrounding framework, side walls or sections slidably mounted in the framework and movable toward a pattern placed therein, and means detachably engaging said walls or sections for moving them toward such pattern.

34. A flask member comprising a framework arranged to engage within a pattern, and side walls or sections slidably mounted in the framework and movable toward a pattern within which such framework is placed.

35. In molding apparatus, a framework arranged to engage within a pattern, side walls or sections slidably mounted in a framework and movable toward a pattern in which such framework is placed, and means for moving the walls or sections toward the pattern.

36. In molding apparatus of the character described, the combination with a flask member having a movable wall, of sand pressing means that engages the wall and effects its movement.

37. In molding apparatus of the character described, the combination with a flask member having a movable wall, of means that engages the wall to move the same and simultaneously presses the sand in the member.

38. In molding apparatus of the character described, the combination with a flask member having a movable wall, of sand pressing means having a sliding engagement with the wall to effect its movement.

Witness my hand this 28th day of April, 1909, at Warren, Ohio.

WILLIAM C. WINFIELD.

Witnesses:
W. F. CORBIN,
DAVID R. GILBERT.

---

Copies of this patent may be obtained for five cents each, by addressing the "Commissioner of Patents, Washington, D. C."